(12) United States Patent
Dara et al.

(10) Patent No.: US 10,742,551 B2
(45) Date of Patent: Aug. 11, 2020

(54) PACKET PATH RECORDING WITH FIXED HEADER SIZE

(71) Applicant: CISCO TECHNOLOGY, INC., San Jose, CA (US)

(72) Inventors: Sashank Venkata Krishna Dara, Bangalore (IN); Shwetha Subray Bhandari, Bangalore (IN); Frank Brockners, Köln (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 318 days.

(21) Appl. No.: 15/188,810

(22) Filed: Jun. 21, 2016

(65) Prior Publication Data
US 2017/0366456 A1 Dec. 21, 2017

(51) Int. Cl.
| | |
|---|---|
| *H04L 12/733* | (2013.01) |
| *H04L 29/06* | (2006.01) |
| *H04L 12/749* | (2013.01) |
| *H04L 12/721* | (2013.01) |
| *H04L 12/715* | (2013.01) |
| *H04L 12/751* | (2013.01) |
| *H04L 12/717* | (2013.01) |

(52) U.S. Cl.
CPC ........... *H04L 45/741* (2013.01); *H04L 45/20* (2013.01); *H04L 45/26* (2013.01); *H04L 69/22* (2013.01); *H04L 45/02* (2013.01); *H04L 45/04* (2013.01); *H04L 45/34* (2013.01); *H04L 45/42* (2013.01)

(58) Field of Classification Search
None
See application file for complete search history.

(56) References Cited

U.S. PATENT DOCUMENTS

| | | | |
|---|---|---|---|
| 9,455,903 B2 | 9/2016 | Hui et al. | |
| 2005/0083936 A1* | 4/2005 | Ma | H04L 45/04 370/392 |
| 2006/0050630 A1* | 3/2006 | Kobayashi | H04L 67/1097 370/216 |
| 2011/0063979 A1* | 3/2011 | Matthews | H04L 45/302 370/237 |
| 2011/0072004 A1* | 3/2011 | Pettovello | G06F 16/835 707/715 |
| 2014/0036908 A1 | 2/2014 | Hui et al. | |
| 2015/0003255 A1* | 1/2015 | Frost | H04L 45/24 370/238 |

(Continued)

OTHER PUBLICATIONS

International Search Report and Written Opinion in corresponding International Application No. PCT/US2017/038152, dated Sep. 29, 2017, 12 pages.

(Continued)

*Primary Examiner* — Jason E Mattis
*Assistant Examiner* — Hong Shao (57) ABSTRACT

Aspects of the embodiments are directed to systems, apparatuses and methods performed at a network element. Embodiments include receiving a packet; identifying a hop number for the network element; identifying a unique identifier for the network element; determining a path identifier based on the hop number and the unique identifier; augmenting the packet metadata with the path identifier; and transmitting the packet to a next network element.

20 Claims, 5 Drawing Sheets

(56) References Cited

U.S. PATENT DOCUMENTS

| | | | |
|---|---|---|---|
| 2015/0103827 A1* | 4/2015 | Quinn | H04L 45/74 |
| | | | 370/392 |
| 2015/0195197 A1* | 7/2015 | Yong | H04L 45/74 |
| | | | 370/392 |
| 2015/0207746 A1 | 7/2015 | Clemm et al. | |
| 2016/0028640 A1 | 1/2016 | Zhang et al. | |

OTHER PUBLICATIONS

Pei, Guangyu, et al., "Measurements on Delay and Hop-Count of the Internet," Sep. 1998, 9 pages.

* cited by examiner

PACKET PATH RECORDING WITH FIXED HEADER SIZE

FIELD

This disclosure pertains to packet path recording with a fixed header size.

BACKGROUND

As networks continue to dramatically grow and scale up, boundaries of how to perform operations, administration, and maintenance (OAM), and telemetry and service level agreement (SLA) reporting at scale are tested and stretched. In computer networking, OAM includes processes, functions, activities, tools, etc. that are designed to monitor network operation in order to detect network faults and to measure performance of the network. In-band OAM is an 'always on' service that adds forwarding path or service path information in addition to other information and/or statistics to all network traffic. The information can be very detailed information about the forwarding behavior that every packet in the network experiences. If in-band OAM is enabled for every packet in a network with all features, an enormous amount of data could potentially be created. Additionally, network operators may desire to know the path a packet traverses for network planning or troubleshooting purposes.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

This disclosure describes systems, methods, and apparatuses to record the path a packet took using a fixed amount of space in the packet header.

Aspects of the embodiments are directed to a method performed at a network element, the method including receiving a unique identifier from a controller; receiving a packet; identifying a hop number for the network element; identifying a unique identifier for the network element; determining a path identifier based on the hop number and the unique identifier; augmenting the packet metadata with the path identifier; and transmitting the packet to a next network element.

Aspects of the embodiments are directed to a network element that includes at least one memory element having instructions stored thereon and at least one processors coupled to the at least one memory element and configured to execute the instructions. The instructions operable when executed to receiving a packet; identify a hop number for the network element; identify a unique identifier for the network element; determine a path identifier based on the hop number and the unique identifier; augment the packet metadata with the path identifier; and transmit the packet to a next network element.

Aspects of the embodiments are directed to a method performed at a network element, the method including receiving a packet; identifying a path identifier value from the packet metadata; extrapolating a path traversed by the packet based on the path identifier; and providing the path to a controller.

Aspects of the embodiments are directed to a computer-readable non-transitory medium comprising one or more instructions for augmenting metadata of a network service header, that when executed on a processor configure the processor to receive a packet; identify a path identifier value from the packet metadata; extrapolate a path traversed by the packet based on the path identifier; and provide the path to a controller.

Aspects of the embodiments are directed to a network element comprising at least one memory element having instructions stored thereon and at least one processors coupled to the at least one memory element and configured to execute the instructions. The instructions operable when executed to cause the network element to receive a packet; identify a path identifier value from the packet metadata; extrapolate a path traversed by the packet based on the path identifier; and provide the path to a controller.

In some embodiments, determining a path identifier comprises calculating a path identifier value equal to the unique identifier raised to the hop number.

In some embodiments, determining a path identifier comprises calculating a new path identifier value equal to the product of (1) a previously identified path identifier value stored in a field of the packet metadata and (2) the unique identifier raised to the hop number.

In some embodiments, determining a path identifier comprises calculating a path identifier value equal to the logarithm of the unique identifier multiplied by the hop number.

In some embodiments, determining a path identifier comprises calculating a path identifier value equal to the sum of a previously identified path identifier value and the logarithm of the unique identifier multiplied by the hop number.

In some embodiments, the unique identifier is a prime number.

In some embodiments, the unique identifier is a prime number assigned to the network element by a controller.

In some embodiments, the unique identifier is a prime number associated with one of a secure unique device identifier (SUDI) or an 802.1AR certificate.

In some embodiments, augmenting the packet metadata with the path identifier includes retrieving a trail bit from the packet header; calculating the path identifier based on the unique identifier and the hop number; and augmenting the trail bit with the path identifier.

In some embodiments, identifying a hop number for the network element comprises identifying the hop number based on a hop limit in the packet metadata.

In some embodiments, extrapolating the path comprises determining one or more prime factors of the path identifier; and for each prime factor of the path identifier, identifying an associated network element, the packet having traversed the associated network element.

Some embodiments also include, for each prime factor, identifying a corresponding exponent, the corresponding exponent corresponding to a hop number, wherein the path comprises the network element and the hop number.

Approaches such as traceroute, which rely on probe traffic being sent, have operational shortcomings: Traffic may be load-balanced across multiple paths (as with ECMP) or routers could forward probe traffic differently from regular traffic (fast- vs. slow-path forwarding of specific traffic types). Recording the path within the live traffic ("in-band") is an attractive alternative to probe based solutions.

In-band solutions to path or route recording (such IPv4 route recording or the path-tracing option of "in-band OAM for IPv6"), require space in the packet which is directly proportional to the number of hops the packet travels. These solutions store an identifier for each node the packet traverses in the packet.

For large networks with a large amount of nodes and/or long paths this approach can result in a large amount of meta-data being carried in the packet. E.g. if one considers the trivial case of using a single bit per node, then one would require as many bits for recording as there are nodes in the network. In addition, schemes which insert unique meta-data on a per-hop bases suffer from implementation challenges: They either require changes to the size of the packet at every hop (which gives rise to PMTU issues) or the require write operations into the packet at varying locations within the packet (i.e. one needs to read a pointer from the packet and then drop data into the location the pointer indicates, which is hard to perform efficiently in hardware).

The path-tracing described here applies to a specific operational domain where insertion of meta-data into the packets is feasible. Each packet carries a fixed amount of meta-data which is used to record the path as the packet traverses through the network. The meta-data is added when the packet enters a domain, is updated at every node the packet traverses. The meta-data could for example be carried as part of an IPv6 extension header (e.g. as done in "in-band OAM for IPv6"). Here the meta-data for path tracing is referred to as "TRAIL." For typical enterprise or data-center networks, TRAIL would comprise 8 bytes. A more detailed discussion on the scaling capabilities of the approach if found further below.

Figure 1:
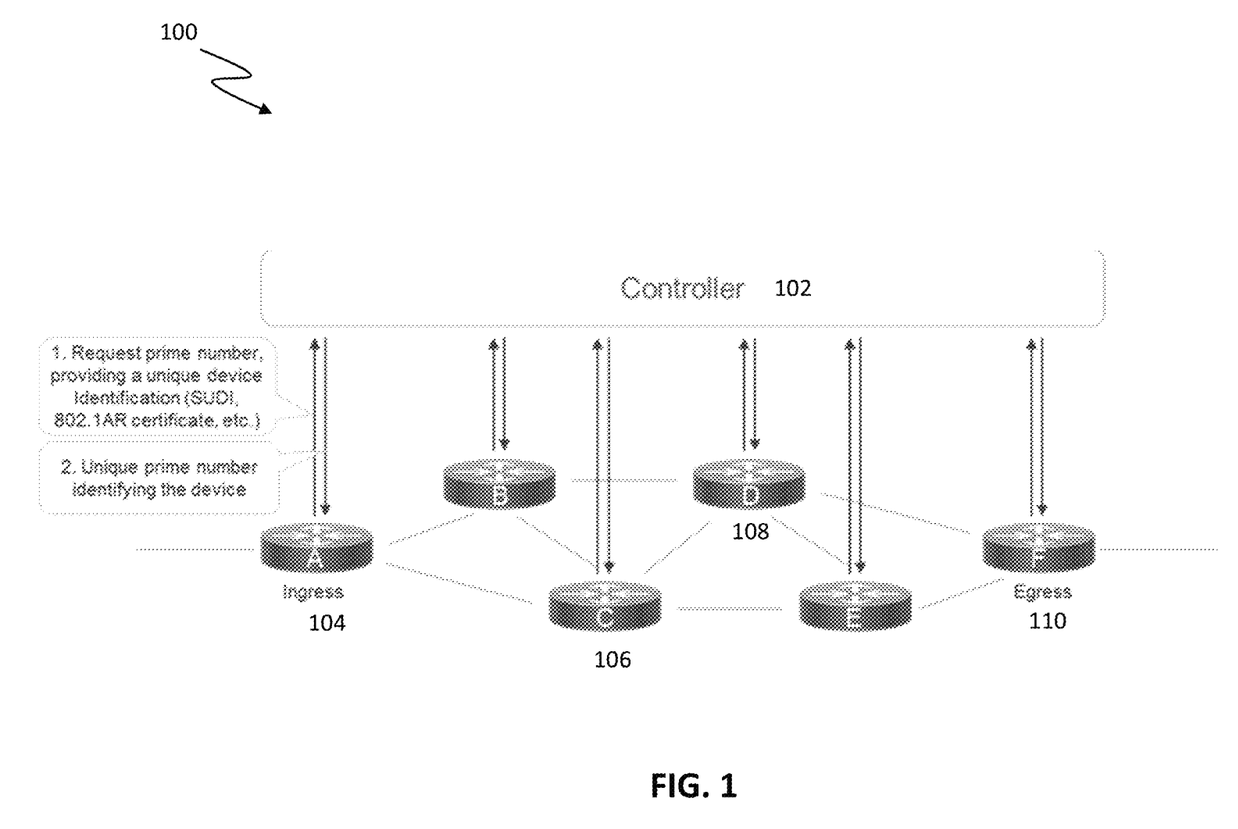
FIG. 1 is a schematic diagram of a network of nodes in accordance with embodiments of the present disclosure.

FIG. 1 is a schematic diagram of a network of nodes 100 in accordance with embodiments of the present disclosure. A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

The network of nodes 100 can include one or more network elements 104, 106, 108, and 110. Network element A 104 in FIG. 1 can be referred to as an ingress network element. Network element F 110 can be referred to as an egress network element. Network element C 106 and network element D 108 can be network nodes that perform functions or route packet traffic through the network or perform other operations, such as service functions, etc. Network elements can be physical entities or can be virtual entities.

Nodes 104-110 can be interconnected by various methods of communication. For instance, the links between nodes may be wired links or shared media (e.g., wireless links, PLC links, etc.) where certain nodes, such as, e.g., routers, sensors, computers, etc., may be in communication with other nodes, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets (e.g., traffic and/or messages sent between the devices/nodes and/or control packets) may be exchanged among the nodes/devices of the computer network 100 using predefined network communication protocols such as certain known wired protocols (e.g., IPv6), wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

The network of nodes 100 can be controlled by a controller 102. Bootstrapping phase: The controller 102 can distribute unique prime numbers to all nodes 104-110 in the network 100. Devices could be identified through a secure unique device ID (SUDI), an 802.1AR certificate, or similar technique. The controller 102 provides for and maintains a mapping between the node identifier and the unique prime number. FIG. 1 shows a deployment where devices retrieve their unique prime number from a controller, providing a SUDI or 802.1AR certificate as input.

Figure 2:
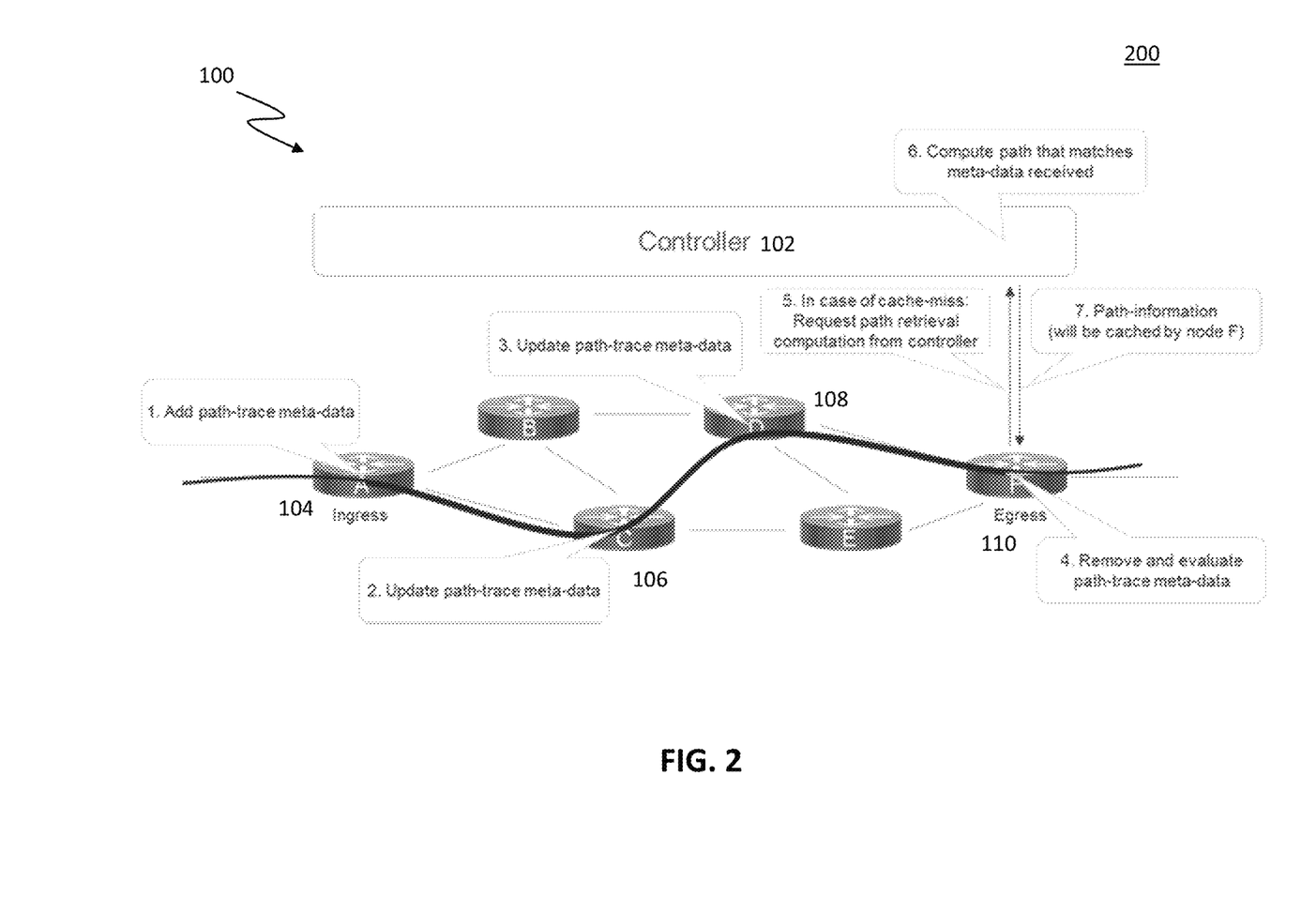
FIG. 2 is a schematic diagram of a packet traversing a network of nodes in accordance with embodiments of the present disclosure.

FIG. 2 is a schematic diagram 200 of a packet traversing a network of nodes in accordance with embodiments of the present disclosure. Once the network domain is bootstrapped, traffic entering that enters the network 100 will have path-tracing meta-data added to the packet. Every node that a packet traverses will update the meta-data based on the process described in FIG. 3. The egress node 110 removes the meta-data, optionally evaluates it, and forwards the packet towards its final destination. Given that path-reconstruction is computationally intense, path-reconstruction computation can be off-loaded to a controller or a similar entity which has sufficient compute resources, while keeping results in a local results cache on the device. In case a packet with path-trace meta-data arrives at an egress node and egress node needs to reconstruct the trail for any purpose, the following three cases can be distinguished:

Packet received and cache miss:
  a. Packet meta-data is sent to the controller to retrieve the path the packet took (see steps 5, 6, and 7 in the diagram below). The cache entry for the meta-data is assigned a value of "0" which represents "path calculation in progress". Note that "log 0" is a non-defined value, and can be used as an indicator here for "calculation in progress" here.

Packet received and "calculation in progress" (cache (meta-data)==0):
  a. No operation (packet forwarding continues while we wait for the result from the controller)
Packet received and cache hit:
  a. Cache-lookup to retrieve the path of the packet: Path=Cache(meta-data). Eventually hand the information to an analytics/statistics module for further processing.

For some of the features that need to only know if the path the packets are taking has changed or compare for equality of paths taken by different packets the metadata can be used as is without any need to compute the trail. This is another advantage that this scheme offers as it represents the path uniquely using 8 bytes of data that can be compared.

Deployment dependent, the notion of what constitutes a "node" can differ. "Node" can represent an entire device (such as a router or a switch), or "node" can represent an interface on a device. In the latter case, the path recording scheme presented here can also be used to not only describe the devices traversed, but also which ingress and egress interfaces on a particular device were used.

Path-retrieval computation can be performed on any device which has sufficient computational resources. This could be a controller (as in the description above), but could also be the egress node itself, or another server.

The choice of 64 bits/8 bytes for the meta-data suggested in this disclosure has large scale deployments in mind (8 bytes offer sufficient precision to represent a 20 digit number). For smaller deployments, differently sized meta-data can be used. I.e. there is no solution dependency on 8 bytes being used.

If order-preservation is needed then 64 bits caters to hundreds of nodes and up to 4 hops.

If order preservation is not needed then 64 bits caters to thousands of nodes and up to 6 or 7 hops.

Networks with millions of nodes would require larger prime numbers and TRAIL calculation could be difficult to deal with as the digits could be very big for factorization. More than 64 bits would be needed resulting in additional overhead in the packet header.

The approach discussed in this disclosure faces scaling challenges for very large networks. Data center networks and SP networks can have more than 10,000 routers and switches in their network—which is a number easy to handle by the solution presented here. With virtualization, servers become network nodes as well—which result in DC networks having eventually up to a million network nodes (each server would also become a network node). Actual data on the diameter of the Internet (average and maximum hop count) also helps bound the computational problem. The network diameter on the Internet could be as large as 30 hops.

For networks with millions of nodes and 30 hops, scaling strategies like the following could be considered:

In some embodiments, an on demand approach can be used: Instead of assigning a unique prime number as part of bootstrapping, we could switch the network (or parts of it) into a "diagnostic mode." The controller could assign the unique prime numbers for the nodes only in a selected part of the network and start calculating the TRAIL during this diagnostic phase alone. This way we don't need large prime numbers to work with and TRAIL could be manageable size.

In situations where networks could be segmented based on e.g. geolocation, one could assign unique prime numbers to the network and diagnose problems on a per area basis. Areas which are the size of an operational domain of an interior gateway protocol can also be handled by the techniques and algorithms described herein (typical numbers, i.e. 500 nodes, average degree of a node equals 8, 70,000 paths to consider in the network—also present the upper bound of what is commonly used for network planning).

By introducing a hierarchy (at the expense of using additional meta-data space), one can also introduce a hierarchy to the methods presented herein:

For example, there could be hierarchal DOMAIN_TRAIL and NODE_TRAIL, so unique primes assigned to DOMAIN and NODES within them.

There could be multiple trails based on segments of network, like TRAIL_1, TRAIL_2 etc. too which is extensible for large number of hops.

Figure 3:
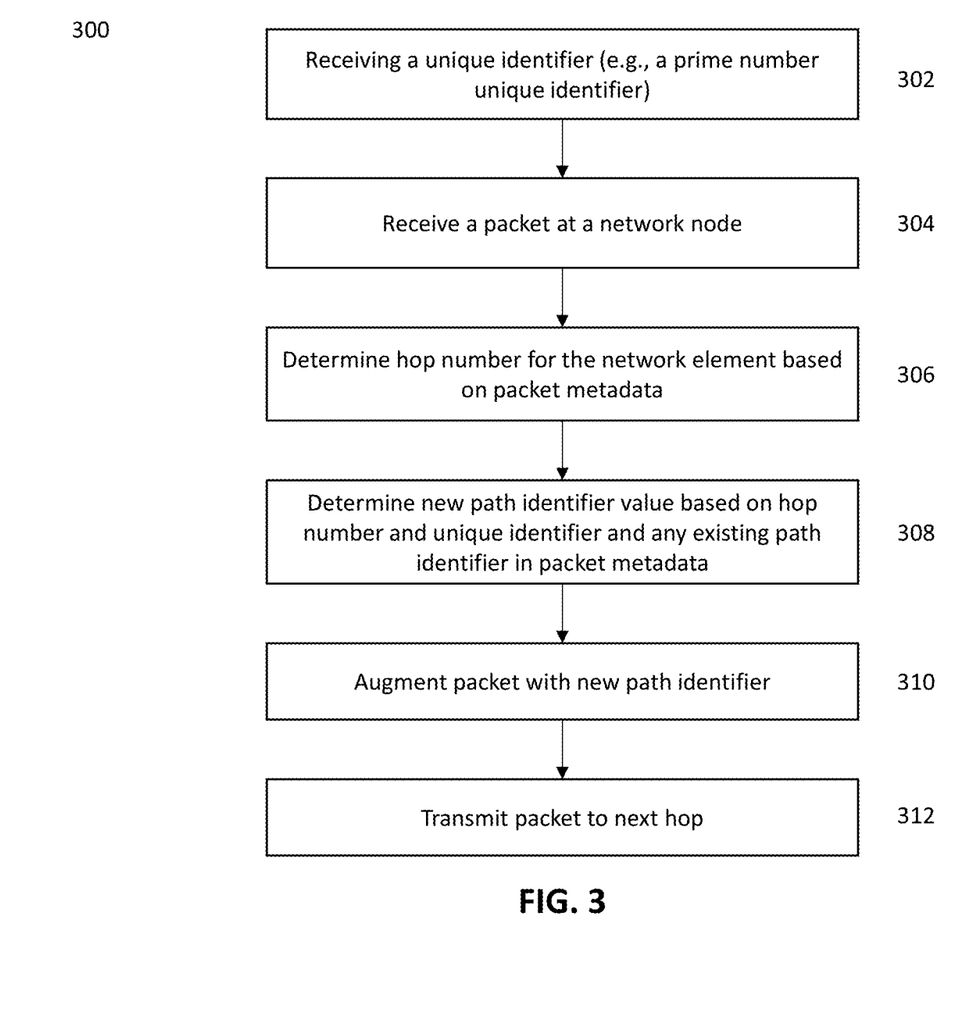
FIG. 3 is a process flow diagram for augmenting a packet with a path identifier in accordance with embodiments of the present disclosure.

FIG. 3 is a process flow diagram 300 for augmenting a packet with a path identifier in accordance with embodiments of the present disclosure. At the outset, each node can be assigned a unique prime number that serves as an identifier for the node in the domain (302). The node (or, more generally, network element) can receive a packet (304).

The network element can determine, based on information in the packet metadata, which hop number the node is with respect to the path the packet is traversing (306). For example, the node can use path limiting values in the packet metadata to extrapolate the hop number of the network element. The hop number can be determined from the TTL/hop-limit (i.e. 255-hop-limit or 255-TTL) in the packet header or a unique index carried in the path that is incremented at each hop within the domain.

The network node can determine a (new) path identifier value based on the identified hop number and the unique identifier. In some implementations, the new path identifier can be determined based on the hop number and the unique identifier and any existing path identifier in packet metadata. For example, the path can be uniquely identified by the product of all prime numbers that represent the nodes on the path.

For example, TRAIL=a×b×c×d

In case a directed path is to be identified (i.e. in case the ordering in which packets traverse a particular set of nodes is of interest), the unique identifier (e.g., prime number) that represents a particular node is raised to the power of the hop number. That way the location of a node on a particular path can be retrieved.

For example, TRAIL=a^1×b^2×c^3, etc., where a, b, c, etc. are unique identifiers associated with each network element and the powers 1, 2, 3, etc., are the hop numbers for each network element. Here the exponent is the hop count or the hop index. In this case, "a" is the unique identifier of the first network element in the path, "b" is the unique identifier of the second network element in the path, and "c" is the unique identifier of the third network element in the path.

In some embodiments, computations can be performed on logarithmic scale with base 10 to achieve a compact and efficient representation of the prime numbers and corresponding powers of prime numbers. The detailed approach is thus:

Log(prime) is assigned to each node.

Log_TRAIL=Log(a)+Log(b)+Log(c) when no order is needed

Log_TRAIL=Log(a)+2 Log(b)+3 Log(c) when order is needed, where the factors multiplied by each log operator represents the hop number for the corresponding network element. Path reconstruction is done by TRAIL=10^(Log_

TRAIL). Find the prime factors of TRAIL and number of occurrences of each prime number to determine order.

The logarithmic scale helps to enable fast math processing at each node.

Fast Math: As Logarithmic arithmetic is used, each node just cumulatively needs to do one addition and one multiplication to the Log_TRAIL. As an optimization the node can skip the multiplication by maintaining a table of possible values of Log(prime)*possible_hop.

Compact representation using logarithmic scale: With 64 bits of Log_TRAIL we could represent around 20 digit numbers.

The network element can augment the packet metadata with the (new) path identifier (310). The network element can then forward the packet to the next hop (312).

Figure 4:
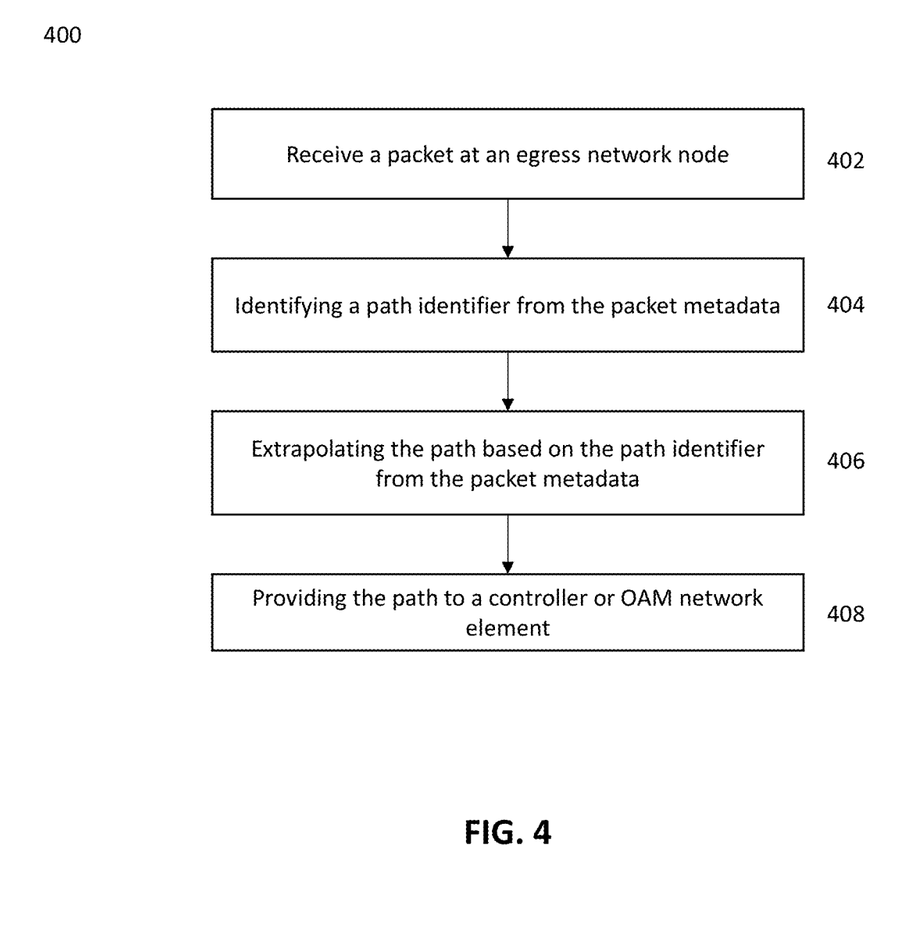
FIG. 4 is a process flow diagram for extrapolating a packet path in accordance with embodiments of the present disclosure.

FIG. 4 is a process flow diagram 400 for extrapolating a path from a path identifier in accordance with embodiments of the present disclosure. The packet can be received at a network element, such as an egress node (402). The egress node can identify a path identifier from the packet metadata (404). The egress node can extrapolate the path (i.e., trail of the packet) from the path identifier (406). For example, to construct the trail of the packet, the egress node can identify prime factors of the path identifier in the TRAIL field of the packet metadata. Each prime factor would represent a node visited. The corresponding exponent of each prime factor would represent the hop number (or order in the path) for the corresponding node.

For example, if the path identifier value in the TRAIL field is 1500, the prime factors are 3×2^2×5^3, so the path would be nodes 3-2-5.

If a log-based path identifier value is used, TRAIL=10^Log_TRAIL and subsequently find the prime factors. Prime factorization is considered a hard problem and highly inefficient for large numbers (here "large" are numbers of the order of more than 200 digits). Smaller numbers can easily be factorized fast with existing algorithms. To enhance efficiency, one can cache frequently used paths and even pre-populate the cache in case the topology is known.

In some embodiments, the Log_TRAIL can be pre-computed for all possible node combinations, and a look-up can be used. While there can be a large number of nodes in the network (e.g. 10^6) and all possible paths will be all the possible permutations of the nodes, in some implementations, only a subset of the paths exist that can be derived from the network topology and routing information base. So it is possible to compute and store Log_TRAIL values of these subset of paths. Reconstruction of the path a packet has taken turns to be a simple table lookup.

In embodiments, the trail bits and meta data specified here can be carried in various parts of a packet. For example, trail bit can be carried as part of the IPv6 header. For example, the trail bit can be carried as an option in an IPv6 extension header, in destination options IPv6 extension header, in an option of a hop by hop IPv6 extension header, as part of a routing options IPv6 extension header, as an IPv6 extension header used for segment routing, or in an IPv6 extension used for Operation, Administration and Maintenance (OAM), or in a combination of any of the above.

In some embodiments, the trail bit can be part of IPv4 header. In some embodiments, the trail bit can be in a tunnel header. In some embodiments, the trail bit can be part of a pseudo label. In some embodiments, the trail bit can be in an extension header of a Network Service Header The identified path can be provided to a controller or OAM network element for identifying errors or other issues with the network (408). In some embodiments, the controller can perform the path reconstruction described above, to off-load calculation from the egress network element.

Figure 5:
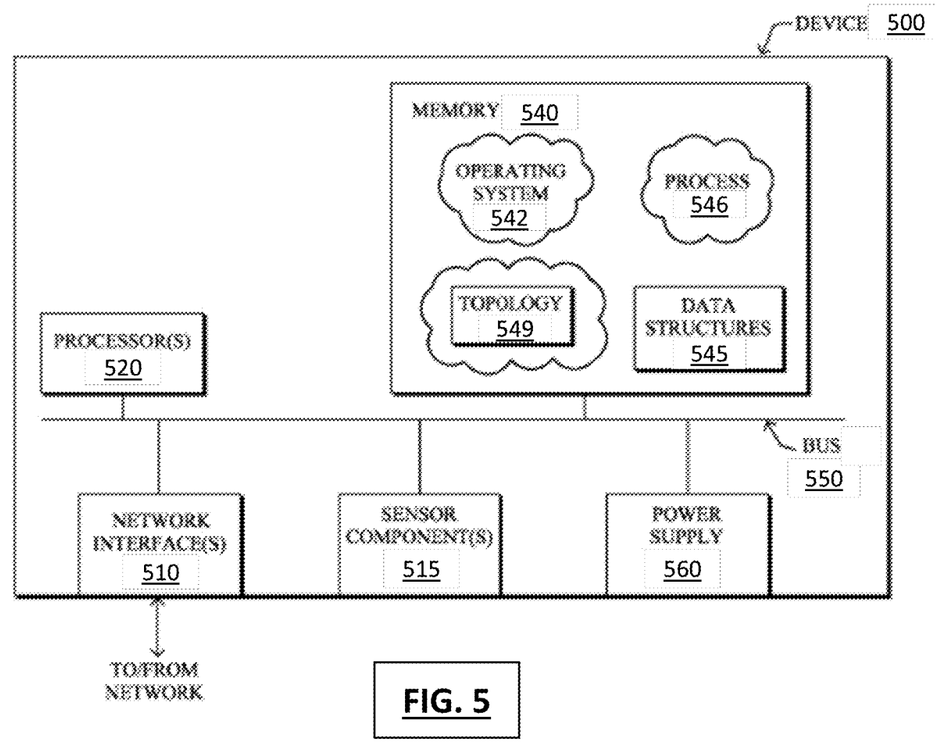
FIG. 5 is a schematic block diagram of an example network element in accordance with embodiments of the present disclosure.

FIG. 5 is a schematic block diagram of an example node/device 500 that may be used with one or more embodiments described herein, e.g., as any of the nodes shown in FIG. 1 above. The device may comprise one or more network interfaces 510 (e.g., wired, wireless, PLC, etc.), at least one processor 520, and a memory 540 interconnected by a system bus 550, as well as a power supply 560 (e.g., battery, plug-in, etc.).

The network interface(s) 510 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 510, e.g., wireless and wired/physical connections, and that the view herein is merely for illustration. Also, while the network interface 510 is shown separately from power supply 560, for PLC the network interface 510 may communicate through the power supply 560, or may be an integral component of the power supply. In some specific configurations the PLC signal may be coupled to the power line feeding into the power supply.

The memory 540 comprises a plurality of storage locations that are addressable by the processor 520 and the network interfaces 510 for storing software programs and data structures associated with the embodiments described herein. Note that certain devices may have limited memory or no memory (e.g., no memory for storage other than for programs/processes operating on the device and associated caches). The processor 520 may comprise hardware elements or hardware logic adapted to execute the software programs and manipulate the data structures 545. An operating system 542, portions of which are typically resident in memory 540 and executed by the processor, functionally organizes the device by, inter alia, invoking operations in support of software processes and/or services executing on the device. These software processes and/or services may comprise Bloom filter routing process/services 546.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

What is claimed is:

1. A method performed at a network element, the method comprising:
   receiving a packet that includes metadata;
   identifying a hop number for the network element;
   identifying a unique identifier for the network element;
   identifying a predetermined path identifier from the metadata of the packet, wherein the predetermined path identifier is indicative of a path of network elements traversed by the packet, the path including one or more other network elements;
   updating the predetermined path identifier to generate an updated path identifier at least in part by performing a mathematical operation using the predetermined path identifier, the hop number, and the unique identifier, wherein performing the mathematical operation comprises one of calculating a path identifier value equal to the unique identifier raised to the hop number or calculating a path identifier value equal to a sum of a previously identified path identifier value and a logarithm of the unique identifier multiplied by the hop number, wherein the updated path identifier is indicative of an updated path of network elements traversed by the packet, the path including the one or more other network elements and the network element;

augmenting the metadata of the packet with the updated path identifier to provide augmented metadata; and transmitting the packet with the augmented metadata to a next network element.

2. The method of claim 1, wherein performing the mathematical operation comprises calculating a new path identifier value equal to a product of: a previously identified path identifier value stored in a field of the metadata, and the unique identifier raised to the hop number.

3. The method of claim 1, wherein the hop number defines an order of nodes visited by the packet.

4. The method of claim 1, wherein the unique identifier is a prime number.

5. The method of claim 4, wherein the unique identifier is a prime number associated with one of a secure unique device identifier (SUDI) or an 802.1AR certificate.

6. The method of claim 1, wherein augmenting the metadata of the packet with the updated path identifier comprises:

retrieving a trail bit or trail bits from a packet header; and augmenting the trail bit or trail bits with the updated path identifier.

7. The method of claim 6, wherein the trail bit or trail bits are stored in one of an IPv4 extension header, an IPv6 extension header, or a network service header.

8. The method of claim 1, wherein identifying the hop number for the network element comprises identifying the hop number based on a hop limit in the metadata.

9. A network element comprising:

at least one memory element having instructions stored thereon;

at least one processor coupled to the at least one memory element and configured to execute the instructions to cause the network element to:

receive a packet that includes metadata;

identify a hop number for the network element;

identify a unique identifier for the network element;

identify a predetermined path identifier from the metadata of the packet, wherein the predetermined path identifier is indicative of a path of network elements traversed by the packet, the path including one or more other network elements;

update the predetermined path identifier to generate an updated path identifier at least in part by performing a mathematical operation using the predetermined path identifier, the hop number, and the unique identifier, wherein performing the mathematical operation comprises one of calculating a path identifier value equal to the unique identifier raised to the hop number or calculating a path identifier value equal to a sum of a previously identified path identifier value and a logarithm of the unique identifier multiplied by the hop number, wherein the updated path identifier is indicative of an updated path of network elements traversed by the packet, the path including the one or more other network elements and the network element;

augment the metadata of the packet with the updated path identifier to provide augmented metadata; and transmit the packet with the augmented metadata to a next network element.

10. The network element of claim 9, wherein performing the mathematical operation comprises calculating a new path identifier value equal to the product of: a previously identified path identifier value stored in a field of the metadata, and the unique identifier raised to the hop number.

11. The network element of claim 9, wherein the hop number defines an order of nodes visited by the packet.

12. The network element of claim 9, wherein the unique identifier is a prime number.

13. The network element of claim 9, wherein the processor is configured to augment the metadata of the packet with the updated path identifier by:

retrieving a trail bit or trail bits from a packet header; and augmenting the trail bit or trail bits with the updated path identifier;

wherein the trail bit or trail bits are stored in one of an IPv4 extension header, an IPv6 extension header, or a network service header.

14. A method performed at an network element, the method comprising:

receiving a packet that includes packet metadata;

identifying a path identifier value from the packet metadata;

extrapolating, from the path identifier value identified from the packet metadata, a path of network elements traversed by the packet at least in part by determining a plurality of prime factors of the path identifier value, wherein each of the plurality of prime factors of the path identifier value is indicative of a corresponding one of the network elements on the path traversed by the packet; and providing the path to a controller.

15. The method of claim 14, wherein extrapolating the path comprises:

for each of the plurality of prime factors of the path identifier value, identifying the corresponding one of the network elements traversed by the packet.

16. The method of claim 15, further comprising, for each of the plurality of prime factors of the path identifier value, identifying a corresponding exponent, the corresponding exponent corresponding to a hop number, wherein the path comprises the corresponding one of the network elements and the hop number.

17. The network element of claim 9, wherein the unique identifier is a prime number associated with one of a secure unique device identifier (SUDI) or an 802.1AR certificate.

18. The network element of claim 9, wherein the hop number for the network element is identified based on a hop limit in the metadata.

19. The method of claim 1, wherein the metadata includes a hop limit, and wherein identifying the hop number is based on the hop limit.

20. The network element of claim 9, wherein the metadata includes a hop limit based on which the hop number is identified.

* * * * *